United States Patent [19]

Nojiri et al.

[11] 4,140,271
[45] Feb. 20, 1979

[54] METHOD AND APPARATUS TO READ IN BAR-CODED INFORMATION

[75] Inventors: Tadao Nojiri, Kariya; Akio Sugiura, Nagoya; Masahiro Nomura, Kariya, all of Japan

[73] Assignee: Nippondenso Co., Ltd., Kariya, Japan

[21] Appl. No.: 668,036

[22] Filed: Mar. 18, 1976

[30] Foreign Application Priority Data

Apr. 17, 1975 [JP] Japan .................. 50-46682
Feb. 2, 1976 [JP] Japan .................. 51-10734

[51] Int. Cl.² ............................................... G06K 7/10
[52] U.S. Cl. .............................. 235/440; 235/456; 235/463
[58] Field of Search .......................... 340/146.3 D; 235/61.11 E, 61.11 A, 61.11 D, 61.7 R, 61.12 N, 462, 463, 470, 454, 456, 440; 360/6, 47

[56] References Cited

U.S. PATENT DOCUMENTS

| | | | |
|---|---|---|---|
| 3,627,991 | 2/1971 | Beall et al. | 235/454 |
| 3,743,819 | 7/1973 | Kapsambelis | 235/61.11 E |
| 3,774,014 | 11/1973 | Berler | 235/61.11 E |
| 3,868,634 | 2/1975 | Dolch | 235/61.11 E |
| 3,870,865 | 3/1975 | Schneiderham et al. | 235/456 |
| 3,876,981 | 4/1975 | Welch | 235/61.11 E |
| 3,879,693 | 4/1975 | Roscoe et al. | 235/61.11 E |
| 3,949,363 | 4/1976 | Holm | 235/61.11 E |
| 4,070,584 | 1/1978 | Chartraire et al. | 235/454 |

*Primary Examiner*—Vincent P. Canney
*Attorney, Agent, or Firm*—Cushman, Darby & Cushman

[57] ABSTRACT

Bar symbols having different bar width for representing information are grouped and recorded on a surface of an object. A light-responsive sensor is swept automatically to repetitively scan the density of the surface-reflected light along the direction in which the grouped bar symbols are arranged, while the object is moved orthogonally thereto. Electrical signals indicative of the bar width derived from the sensor are processed thereafter for the read-in of the coded data.

15 Claims, 8 Drawing Figures

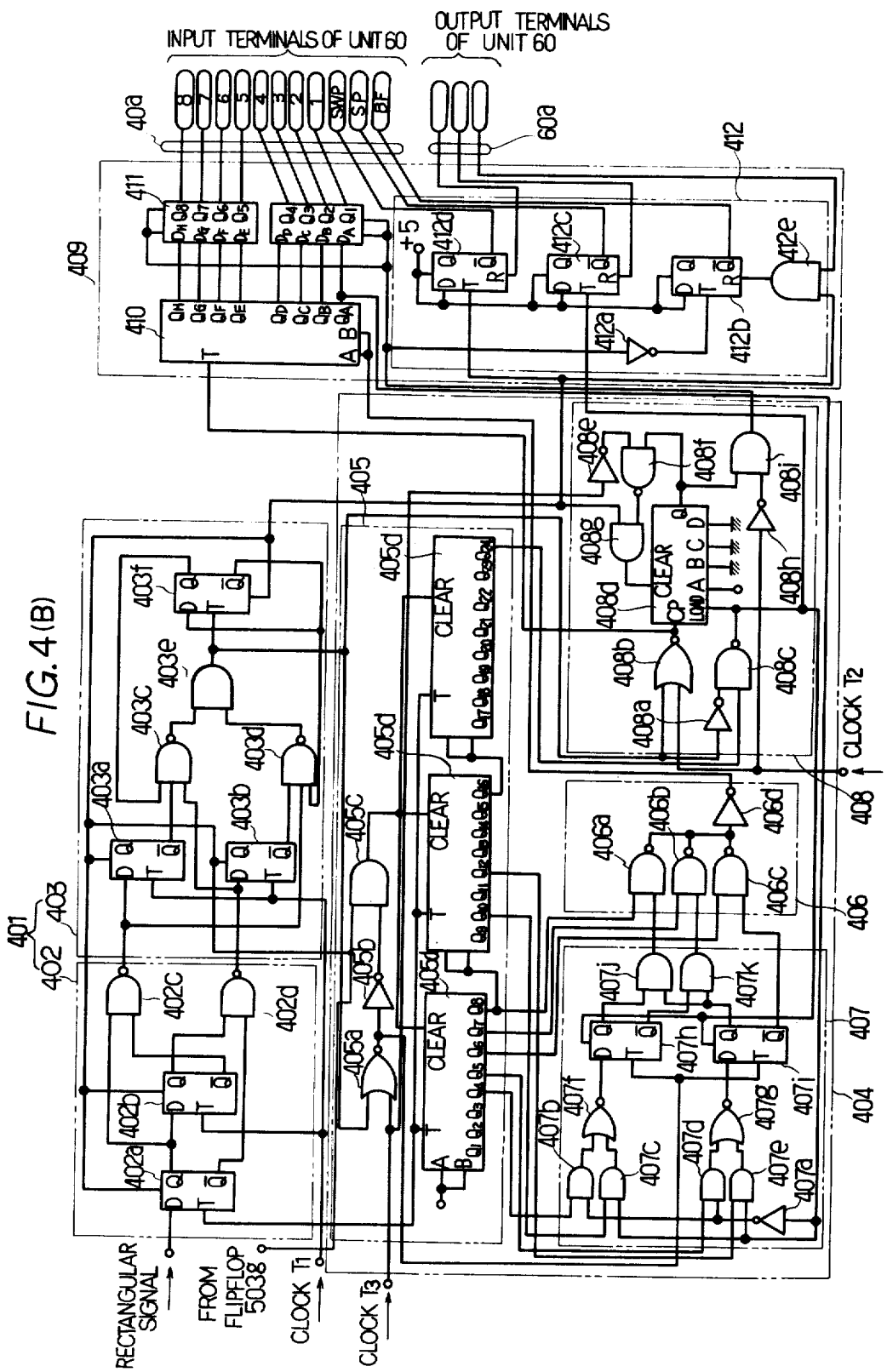

METHOD AND APPARATUS TO READ IN BAR-CODED INFORMATION

BACKGROUND OF THE INVENTION

(1) Field of the Invention

The present invention relates to a method and apparatus to automatically and electronically read in bar codes, each of which is recorded with a plural numbers of bar symbols of different width on a surface of an object.

(2) Description of the Prior Art

Information encoding and decoding techniques are well known in the art. One of these prior art techniques is shown in FIG. 1 schematically. In the shown art, numbers of bar symbols 80b of different bar width and light reflectivity are printed in parallel with each other on a card 80 to represent information. A pen-type reader A, electrically coupled to a signal processing unit B, is manually actuated to slide over and scan the bar symbols 80b in a direction orthogonal thereto. The reader A is light-responsive and electrical signals corresponding to the bar width and the light reflectivity are derived from the reader A and processed to be read in the unit B thereafter. Since the manual reader scanning speed is apt to change, the read-in accuracy does not suffice for practical use. Further to avoid reading error, one must avoid scanning over the smeared part of the symbols, which necessitates considerable experience and skill.

SUMMARY OF THE INVENTION

It is, therefore, an object of the present invention to provide a method and apparatus wherein bar codes are automatically scanned and read in with high accuracy.

It is another object of the invention to provide a method and apparatus wherein bar codes are repetitively scanned and read in.

It is a further object of the invention to provide a method and apparatus wherein the consecutively read-in date is checked for high read-in accuracy.

It is still further object of the invention to provide a method to encode information with grouped bar codes.

The present invention will be described with reference to accompanying drawings, wherein.

Figure 1:
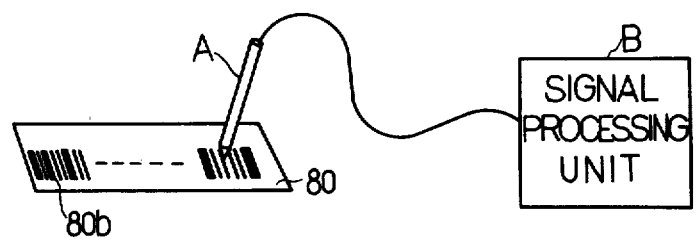
FIG. 1 is a schematic diagram illustrating one of prior arts.
Figure 2:
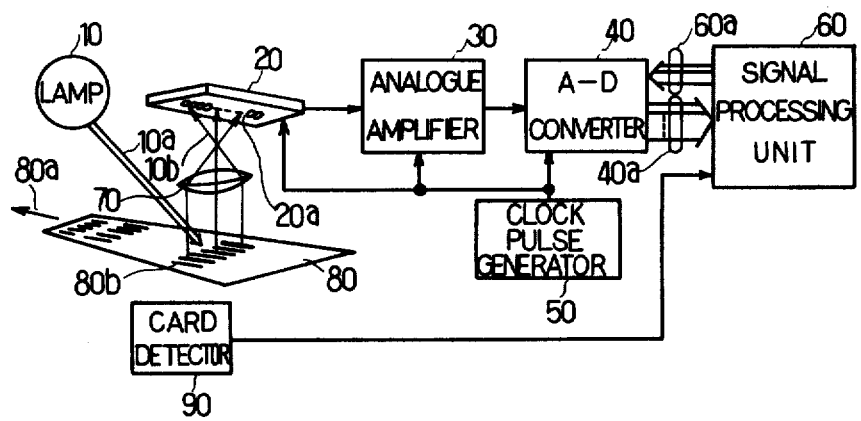
FIG. 2 is a schematic diagram illustrating an embodiment according to the present invention.
Figure 4A:
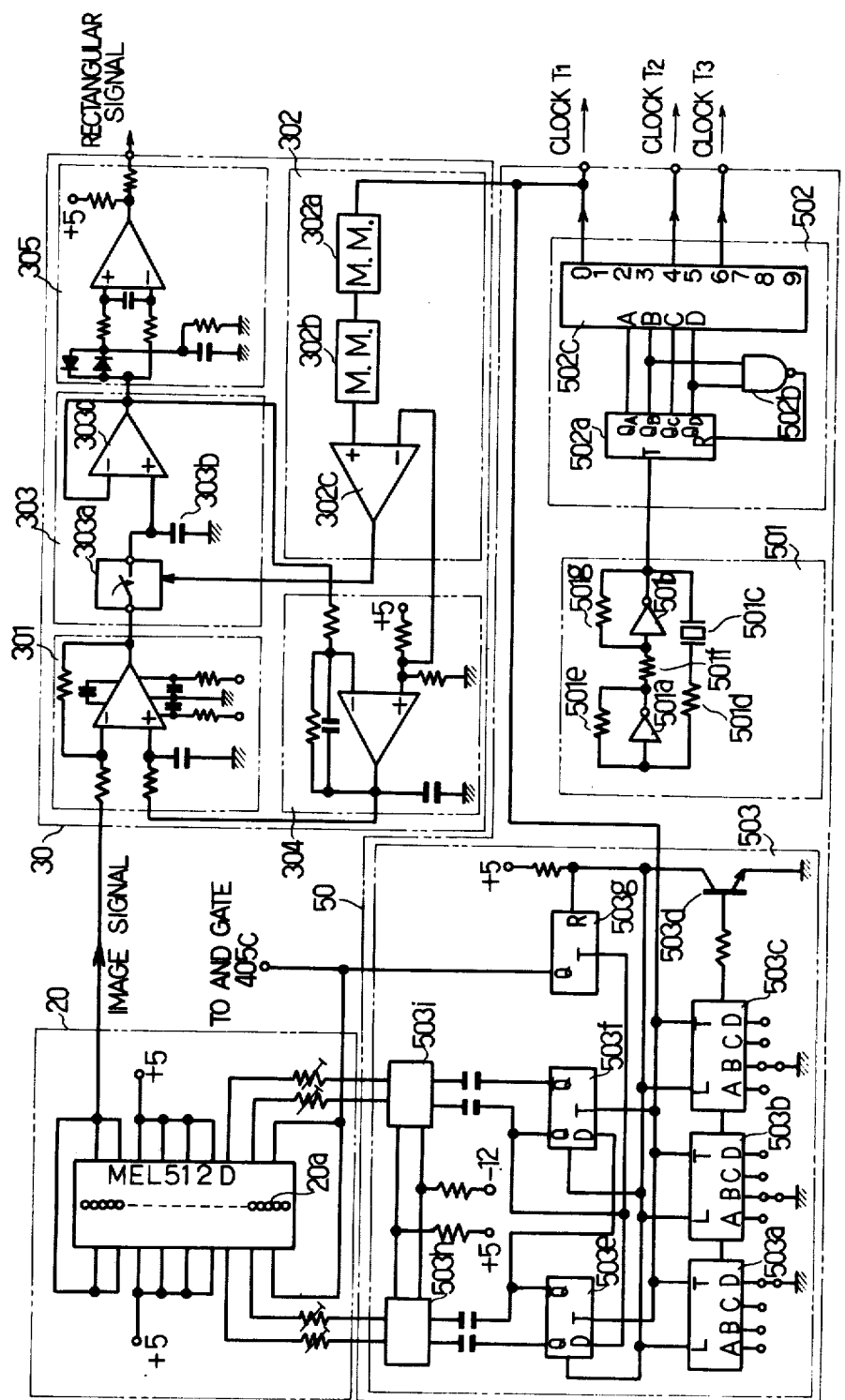
Figure 5:
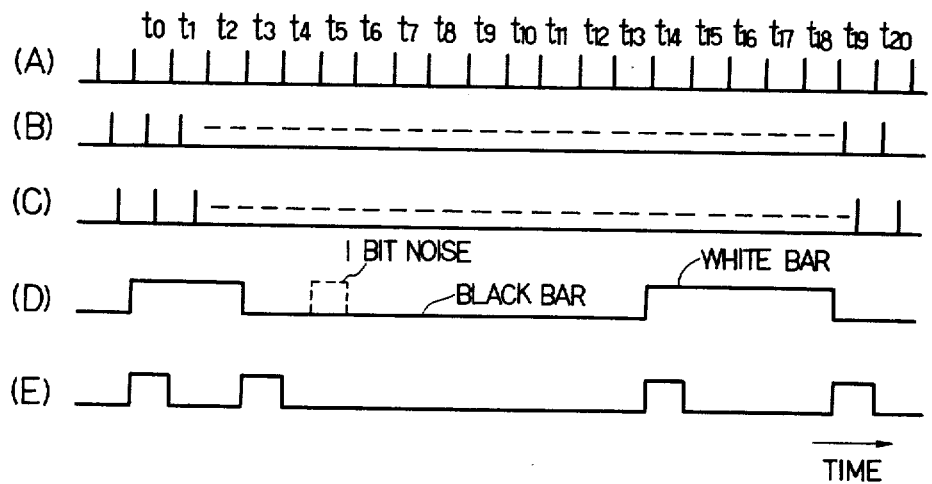
Figure 6:
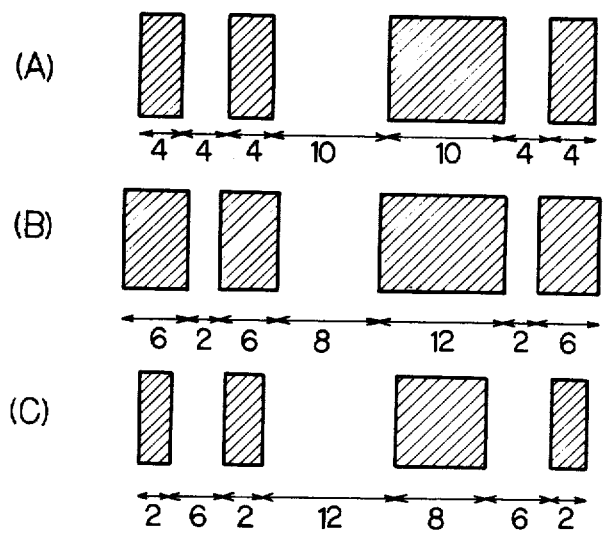
Figure 7:
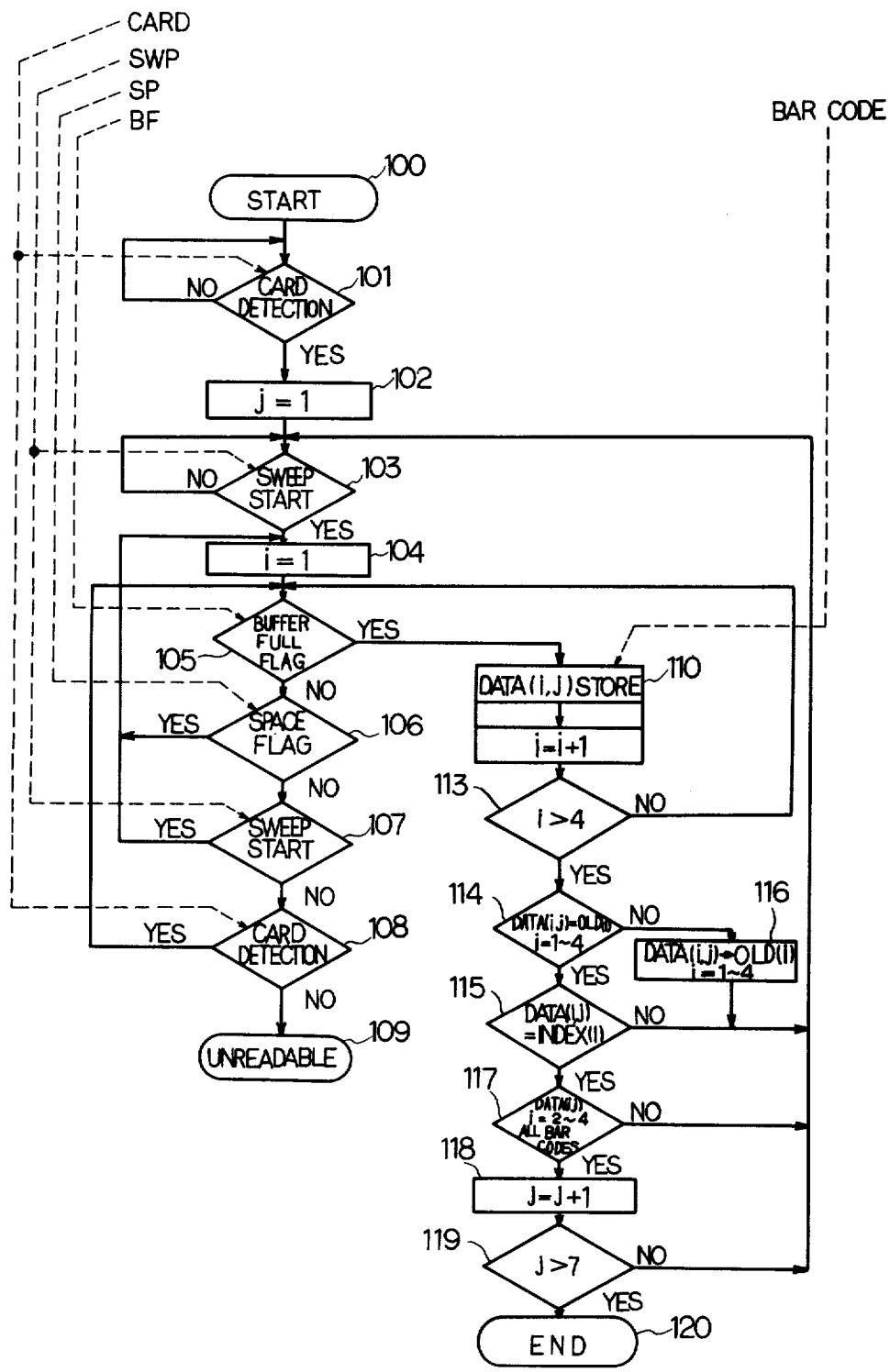

FIGS. 4 (A) and (B) are electric wiring diagrams illustrating the details of the circuit construction shown in labeled blocks in FIG. 2;

FIGS. 5 (A) to (E) are signal charts illustrating signal waveforms produced at various points in FIGS. 4 (A) and (B);

FIGS. 6 (A) to (C) are enlarged plan views of bar codes under the various printing conditions; and FIG. 7 is a flow chart illustrating signal processing sequence of the signal processing unit shown in FIG. 2.

DESCRIPTION OF THE PREFERRED EMBODIMENT

Referring first to FIG. 2, a light source 10 such as a reflector lamp is employed to uniformly supply illumination light 10a over a card 80. An image sensor 20 such as a solid image sensor having a photo diode array 20a comprising a plurality of photo diodes aligned on a read-in line receives the image to produce respective signals indicating the density of the reflected light 10b from the card 80. Each photo diode of the diode array is swept in sequence upon receipt of clock pulses from a clock pulse generator 50 and generates a train of image signals, the signal level of which corresponds to the density of the reflected light 10b. The image sensor 20 is connected through an analogue amplifier 30 to an analogue-to-digital converter 40 to convert the train of image signals into plural bits of digital signals, upon receiving clock signals from the clock pulse generator 50. Connected to the A-D converter 40 is a signal processing unit 60 such as a micro processor to read in scanned bar codes represented by the digital signals of plural bits in accordance with a predetermined digital processing program. The plural bits of digital signals produced in parallel with each other are transmitted to the unit 60 via transmission lines 40a, whereas completion signals indicative of the read-in completion of the bar codes are oppositely transmitted via transmission lines 60a. A lens 70 is operatively coupled to the image sensor 20 and provides the image sensor 20, diode array thereof in particular, with the image after converging the reflected light 10b. On a surface of the card 80 are printed numbers of bar codes. According to the present invention, printed bar codes are grouped into several columns which are parallel to each other. Each bar symbol 80b of the bar codes is arranged to extend in parallel with a card transferring direction denoted by an arrow 80a. The card transferring direction is transverse to the read-in line of the image sensor 20. The card 80 may be transferred manually or automatically. A light responsive card detector 90 is connected to the signal processing unit 60 to detect presence of the card 80 transferred thereover. When the card 80 is loaded and moves in beneath the read-in line of the sensor 20, the illumination light 10a which has been received by the card detector 90 is cut off by the card 80 and reflected. When the card detector 90 is stopped receiving the illumination light 10a, it generates a card detection signal to be applied as card information to the unit 60.

Figure 3:
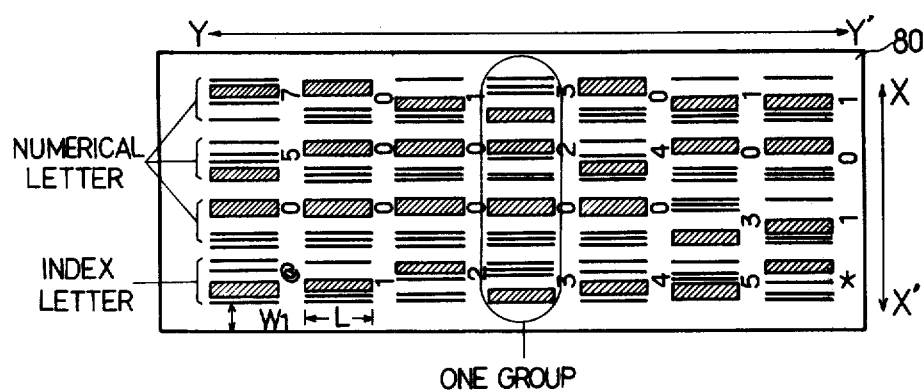
FIG. 3 is an enlarged top plan view of the card illustrated in FIG. 2.

Bar-coded information on the card 80 according to the present invention is shown in FIG. 3. Each bar symbol is recorded in black and white and in wide and narrow width. Thus combined, four kinds of bar symbols have a unit length L. Each bar code (one letter or one digit) consists of two wide bar symbols and five narrow bar symbols determined by four black bar symbols and three white bar symbols therebetween. Thus one letter is derived from "2 OUT OF 7 combinations" in which two wide bar symbols in black and in white among a total of seven bar symbols are used. Further, the bar width N and W of the respective narrow and wide bar symbols are determined to satisfy the relationship W=2.5N therebetween. Thus, the total width 10N (5N+2W) is alloted for each letter on the card 80, and the same width W as the wide bar symbol is alloted between adjacent two letters. A group of bar codes are aligned in a column (X-X' direction) parallel to the above read-in line of the image sensor 20 to constitute a 4-digit letter comprising an index letter and threee numerical letters. Each group of bar codes in each column is juxtaposed with its head and tail lining up in a direction (Y-Y' direction) which coincides with the card transferring direction 80a. And at the marginal portions, white spaces of the width $W_1$ are formed as record prohibition regions. The width $W_1$ is arranged to be wider than 6N. It must be noted that the specific index letters @ and * excluded from the above-described "2 OUT OF 7 combinations" are used respectively in the first and the last groups so that the encoded information of the card may not be erroneously read in when the card is transferred in the opposite direction. Thus, the bar coded information having seven groups in rows includes letter information of twenty-one digits per card.

Detailed circuit construction of the preferred embodiment will be explained with reference to FIG. 4(A) and FIG. 4(B). In FIG. 4(A), the clock pulse generator 50 comprises an oscillation circuit 501, a frequency divider circuit 502 and a clock control circuit 503. The oscillation circuit 501 comprises inverters 501a and 501b, a crystal oscillator 501c, and four resistors 501d and 501g, and generates clock pulses of a fixed frequency (2.8MHZ). The frequency divider 502 is connected to the circuit 501 and comprises a binary counter 502a, a NAND gate 502b and a decoder 502c, and produces frequency-divided first, second and third clock pulses $T_1$, $T_2$ and $T_3$ as respectively shown in (A) to (C) of FIG. 5. These three clock pulses are the same in frequency (280KHZ), but different in phase by a predetermined phase angle. The clock control circuit 503 is connected to the frequency divider circuit 502 and comprises three presettable counters 503a to 503c, a transistor 503d, three D type flip-flops 503e to 503g, and drivers 503h and 503i. The circuit 503 electrically controls the image sensor 20 in response to the first clock pulses $T_1$.

A solid image sensor 20 is available as MEL 512D manufactured by MATSUSHITA ELECTRIC CO., LTD. and has diode array 20a of 512 photo diodes aligned on its read-in line. 4 diodes and 10 diodes of the diode array 20a are used to scan the respective narrow and wide bar symbols. Upon receipt of the first clock pulses $T_1$, each diode senses the light density of the reflected light 10b and produces an image signal, the signal level of which is indicative of the sensed light density. Since the diodes are sequentially swept by the first clock pulses $T_1$ to result in constant speed scanning, image signals produced from the image senser 20 are serial train signals of 512 bits per one sweep and 4 bits and 10 bits of the image signals correspond to the respective narrow and wide bar width. It must be understood that 1 bit of the image signals is equal to one cycle of the first clock pulses $T_1$. Further, since the diodes are cyclically swept by the first clock pulses $T_1$, the bar codes in each group are repetitively scanned by the image sensor 20 while the card 80 is transferred, thus resulting in serial image signals of 512 bits corresponding to one scanning. The scanning repetition number per one group is determined by the card transferring speed and the bar length L. Hundreds of scanning repetition for one group can be made possible in case that the bar length L is 10 millimeters and the card transferring speed is 10 millimeters per second.

The analogue amplifier 30 comprises an amplifier 301, a sampling pulse generator 302, a sample hold circuit 303, a low pass filter 304 and a reshaping circuit 305. The amplifier 301 receives the train of image signals from the image sensor 20 and amplifies the signals. The sampling pulse generator 302 comprises monostable multivibrators 302a and 302b and a level conversion comparator 302c and produces sampling pulses in synchronism with the first clock pulses $T_1$ of the clock pulse generator 50. The sample hold circuit 303 comprises an analogue switch 303a, a capacitor 303b and a buffer 303c and receives the sampling pulses and the amplified image signals from the respective sampling pulse generator 302 and the amplifier 301. When the analogue switch 303a is closed upon receipt of the sampling pulse, the amplified image signal from the amplifier 301 is stored on the capacitor 303b. Thus the sampled and stored signal is converted to a continuous signal by the capacitor 303b and the comparator 303c, and negatively fed back to the amplifier 301 thereafter through the filter 304. The low pass filter 304 is connected to the sample hold circuit 303. The cut-off frequency of the filter 304 is predetermined to be lower than the frequency (28KHZ) corresponding to 10 bits of diode array to pass low frequency components of the continuous signal. As a result, the sample hold circuit 303 produces a continuous signal with less low frequency noises. The low frequency noises included in the image signals are mainly caused by the light density fluctuation of the illumination light 10b. The negative feedback loop of low pass filter 304, therefore, need not be employed if unnecessary. The reshaping circuit 305 connected to the sample hold circuit 303 receives the signals and produces reshaped rectangular signals as shown in (D) of FIG. 5. The rectangular signals alternately changes to "1" level and "0" level corresponding to respective white bar symbol and black bar symbol.

Detailed circuit construction of the A-D converter 40 is shown in FIG. 4(B). The A-D converter 40 comprises a level change detection circuit 401 in which a level change time detector 402 and a digital filter 403 are coupled, a time interval discrimination circuit 404 in which a time interval counter 405, a discriminator 406, a presetter 407 and a memory command pulse generator 408 are provided, and a data conversion circuit 409 in which a shift register 410, a data register 411 and a condition detector 412 are provided. The A-D converter 40, converts rectangular signals from the analogue amplifier 30 into digital signals of plural bits indicative of each bar code. The level change detector 402 comprises D type flip-flops 402a and 402b, and NAND gates 402c and 402d. Level changes of rectangular signals fed from the amplifier 30 are detected by the flip-flops 402a and 402b, and first reversion pulses and second reversion pulses, in synchronism with the first clock pulses $T_1$, are produced at respective outputs of the NAND gates 402c and 402d. The first reversion pulses represent the level change of the rectangular signals from "0" level to "1" level, whereas the second reversion pulses indicate the level change from "1" to "0". The digital filter 403 comprises D type flip-flops 403a and 403b, NAND gates 403c and 403d, an AND gate 403e, and a ½ divider 403f. The first and second reversion pulses are fed to the respective flip-flops 403a and 403b, and combined thereafter through gates 403c, 403d and 403e. The pulse signals produced at the output of the AND gate 403e are ½ frequency-divided by the divider 403f, and then fed back to the NAND gates 403a and 403b to thereby eliminate 1 bit noise signal shown in (D) of FIG. 5. Thus a noise-free pulse signal or detection signal from the AND gate 403e as shown in (E) of FIG. 5 is obtained. The detection signal represents a signal level change of the rectangular signals applied from the analogue amplifier 30, and each time interval of one cycle detection signal represents each bar width of the bar symbols. The flip-flop 403f can be excluded in case the 1 bit noise elimination is not required. It must be noted that the time intervals for wide and narrow bar symbols correspond to 10 bits and 4 bits of the first clock pulses $T_1$ respectively, if the bar symbols have regular width.

The detection signal is then applied to the time interval discrimination circuit 404 and the scanned bar width is discriminated therein. The width discrimination is processed with reference to 7 bits which is the medium value (medium width) between 4 bits and 10 bits for the respective and wide bar symbols and has 3 bits difference from both bar width ends. However, less bit difference is obtained when the printed bar width is not regularly provided. FIG. 6(B) shows an irregularly printed bar code, wherein black bar symbols are 2 bits wider and white bar symbols are 2 bits narrower than respective regular bar symbols shown in (A) of FIG. 6. Numbers added below the bar symbols of FIG. 6 designate the number of photo diodes of the image sensor 20 alloted thereto. FIG. 6(C) shows another irregular bar code, wherein black bar symbols are 2 bits narrower and white bar symbols 2 bits wider than the respective regular bar symbols. In both irregular codes either 1 bit difference or 5 bits difference is obtained with the same width discrimination with regard to the reference value of 7 bits as in the regular codes. In order to obviate the 1 bit difference from the reference value which is otherwise likely to result in erroneous discrimination, the reference value is changed to obtain at least 2 bits difference. Changing the reference value is made based on a preceding width discrimination result, a preceding bit difference in particular. To this end the actual bar width is compared with the regular width to derive the difference therebetween, which in turn, changes the discrimination reference width in a manner that an irregularly widened bar symbol narrows adjacent bar symbols without changing the center thereof. Provided that the scanned narrow bar width is 5 bits which is 1 bit wider than the regular width of 4 bits, for example, the reference width for the following discrimination is set to 6 bits which is 1 bit narrower than the ordinary reference width of 7 bits. In this manner the reference width for width discrimination is alternately changed to 6 bits and 8 bits in case of irregularly provided bar codes shown in (B) and (C) of FIG. 6, thus constantly obtaining either 2 bits or 4 bits difference from the changed reference value in each width discrimination. The lesser 2 bits difference therebetween is more available to obviate erroneous discrimination than the above 1 bit difference.

The above reference value modification is described in more detail hereinunder. Referring back to FIG. 4(B), the time interval counter 405 comprises a NOR gate 405a, an inverter 405b, an AND gate 405c and a 24 bits shift register 405d. The detection signal from the digital filter 401 and the clock pulses $T_1$ are both applied to the NOR gate 405a, and third clock pulses $T_3$ are allowed to pass only when the detection signal maintains a "1" level indicative of the rectangular signal level change. The third pulses $T_3$ passing through the NOR gate 405a are inverted by the inverter 405b and applied to the AND gate 405c with the first pulses $T_1$, and to the shift register 405 as a clear pulse. In the shift register 405d, the first pulses $T_1$ are shifted one by one and the "1" level signal appears at the terminals $Q_1$ to $Q_{24}$ before the register has been cleared by the output pulses of the AND gate 405c.

The discriminator 406 comprises NAND gates 406a, 406b and 406c, respective inputs thereof being connected to respective terminals $Q_8$, $Q_7$ and $Q_6$ of the shift register 405d, and an inverter 406d. The eighth, seventh and sixth output signals from the time interval counter 405 are selected and compared with a preset value in the discriminator 406. The preset value corresponds to the above-described reference width. As the result of the comparison, "1" level or "0" level discrimination signals are derived at an output of the inverter 406d at a respective time when the time interval of the detection signal representing the bar width from the filter 403 is longer or shorter than the preset value. The preset value is changed by the presetter 407 with reference to the preceding discrimination result.

The presetter 407 comprises an inverter 407a, AND gates 407b, 407c, 407d, 407e, 407j and 407, NOR gates 407f and 407g, and D type flip-flops 407h and 407i. The fourth bit, the tenth bit, the fifth bit and the twelfth bit signals from the shift register 405d are applied to the respective AND gates 407b to 407e. Further an output signal from the data conversion circuit 409 is directly applied to the AND gates 407c and 407e, whereas it is applied to the AND gates 407b and 407d through the inverter 407a. The output signal from the conversion circuit 409 coincides with the discrimination signal of the discriminator 406. When the preceding discrimination signal level is "0" (i.e. The preceding bar symbol is narrow one.) and $Q_4$ output level of the register 405d is "0" (i.e. The preceding bar width is narrower than the regular width of 4 bits.) or when the preceding discrimination signal is "1" (i.e. The preceding bar symbol is wide one.) and the $Q_{10}$ output level is "0" (i.e. The preceding bar width is narrower than the regular width of 10 bits.), the AND gate 407j produces a "1" level command signal indicative of the preset value 8. On the other hand, when the preceding discrimination signal level is "0" and the $Q_4$ output level is "1" (i.e. The preceding bar width is the regular 4 bits.) or when the preceding discrimination signal level is "1" and the $Q_{10}$ output level is "1" (i.e. The preceding bar width is the regular 10 bits.), the AND gate 407k produces a "1" level command signal indicative of the preset value 7. Further, the flip-flop 407i produces a "1" level command signal indicative of the preset value 6, when the preceding discrimination signal is "0" and the $Q_5$ output level is "1" (i.e. The preceding bar width is wider than 5 bits) or when the preceding discrimination signal is "1" and the $Q_{12}$ output level is "1" (i.e. The preceding bar width is wider than 12 bits.). Thus based on the preceding discrimination result and width-indicating time period counted by the counter 405, the preset value for the following discriminator 406 is changed among 6 bits and 8 bits by the presetter 407.

The memory pulse generator 408 comprises inverters 408a, 408e and 408h, a NOR gate 408b, NOR gates 408c, 408f and 408g, a counter 408d, and an AND gate 408i. The detection signal from the level change detector 401 are applied to the inverter 408a and the NOR gate 408b, and second clock pulses $T_2$ from the clock pulse generator 50 are applied to the NOR gate 408b and the inverter 408h. The second pulses $T_2$ which passed through the NOR gate 408b when the "1" level detection signal is applied are counted by the counter 408d and a completion signal is produced therefrom when the count value becomes 8. Since the "1" level detection signal is applied each time the color (black or white) of bar symbol changes, the completion signal is produced after seven bar symbols which constitute one bar code are scanned. The NAND gate 408c receives the inverted detection signal from the inverter 408a and the twenty-fourth bit signal from the time interval counter 405 and produces "0" level signal only when the "1" level detection signal is not produced and the $Q_{24}$ output level is "1". The "0" level signal from the NAND gate 408c, in short, represents that the marginal space being wider than 6N is scanned. Receiving the inverted third clock pulses $T_3$ from the inverter 408e and the completion signal from the counter 408d, the NAND gate 408f passes the third clock pulse $T_3$, which is applied to the counter 408d as a clear pulse via the NAND gate 408g. The completion signal is further applied to the AND gate 408i with the inverted second pulses from the inverter 408 and the AND gate 408i produces a memory command pulse. It must be noted that the memory command pulse is produced each time one bar code is fully scanned because the completion signal is indicative of the completion of scanning over one bar code.

In the data conversion circuit 409, parallel output terminals $Q_A$ to $Q_H$ of the 8-bit shift register 410 are connected to respective parallel data input terminals $D_A$ to $D_H$ of the 8-bit data register 411 to which the memory command pulse generator 408 is also connected. The condition detector 412 comprises an inverter 412a, D type flip-flops 412b to 412d, and an AND gate 412e. The train of discrimination signals from the discriminator 406 is applied to the register 410 and shifted to produce each discrimination signal at the $Q_A$ to $Q_H$ output terminals each time the second clock pulse $T_2$ passing through the NOR gate 408b of the memory command pulse generator 408 is applied. Since each signal level of the train of discrimination signals represents bar width (narrow or wide), signal level at the $Q_A$ to $Q_H$ terminals represents the respective bar width in one bar code. Parallel output signals from the shift register 410 are then memorized in the data register 411 when the memory command pulse from the memory command pulse generator 408 is applied thereto and the memorized 8 bits digital signals (bar code information) representing one bar code are applied to the input terminals 1 to 8 of the signal processing unit 60 via the transmission lines 40a. The flip-flop 412b receives the inverted memory command pulse from the inverter 412a and applies to input terminal BF a "0" level signal (buffer full flag information) indicative of the conversion completion of each bar code. The flip-flop 412c receives the output signal of the AND gate 408c and applies to input terminal SP a "0" level signal (space flag information) indicative of the existence of the marginal space on the card. Receiving the first clock pulses $T_1$, the flip-flop 412d applies to input terminal SWP a "0" level signal (sweep start information) indicative of the sweep start of the image sensor 20. These three signals from the condition detector 412 are also transmitted to the signal processor 60 via the transmission lines 40a. Thus the transmission lines 40a provides bar code, buffer full flag, space flag and sweep start informations. The flip-flops 412b, 412c and 412d receive completion signals from output terminals of the signal processing unit 60 via the transmission lines 60a and are reset when the unit 60 terminates reading in the bar codes of one group.

The overall operation of the time interval discrimination circuit 404 and the data conversion circuit 409 is further more described hereinunder, referring to FIG. 5(E) which illustrates the detection signal from the level change detection circuit 401. At time $t_3$, the time interval between which succeeding two detection signals are produced corresponds to 3 bits of the first clock pulses $T_1$. Accordingly only $Q_1$, $Q_2$ and $Q_3$ output terminals of the shift register 405d become "1" level, and the discriminator 406 produces a "0" level signal which represents that the scanned bar width is narrower than the preset reference value 7. The shift register 410 produces a "0" level signal at the first stage output $Q_A$ upon application of the "0" level discrimination signal, and the "0" level signal is applied to the inverter 407a. Thus the bar width discrimination between the time interval $t_0$-$t_3$ is terminated. At that time the outputs at the remaining terminals from $Q_4$ to $Q_{24}$ of the shift register being "0", the NOR gates 407f and 407g produce "1" level signal and the flip-flops 407h and 407i produces "1" level signal at the respective Q terminals. The AND gate 407j then produces "1" level command signal indicative of the present value 8, thus changing the preset reference value 7 to 8 based on the preceding bar width discrimination result. The NAND gate 406a in the discriminator 406 is opened upon application of the "1" level command signal from the presetter 407. Simultaneously the shift register 405d is cleared by the pulse derived from the third clock pulse $T_3$ through the NOR gate 405a, the inverter 405b and the AND gate 405c, and thereafter starts to count the time interval during which the following detection signal shown in FIG. 5(E) appears. At time $t_{14}$, $Q_1$ to $Q_{11}$ outputs of the register 405d become "1" level because the above mentioned time interval corresponds to 11 bits of the first clock pulses $T_1$. The NAND gate 406a produces "0" level signal and the inverter 406d produces "1" level discrimination signal representing that the scanned bar width is wider than the preset value 8. The shift register 410 produces a "1" level discrimination signal at the $Q_A$ output and shifts the preceding "0" level discrimination signal from the $Q_A$ output to the second stage $Q_B$ output in synchronism with the second clock pulse $T_2$. The $Q_A$ output signal of the register 410 and the $Q_4$ to $Q_{11}$ output signals of the register 405d are applied to the presetter 407, and "1" level command signal is produced by the AND gate 407k. The command signal from the AND gate 407k represents the change of preset value from 8 to 7. After the time $t_{14}$, the above operation is repeated. It can be understood that each preset value 6, 7 or 8 is selected based on the preceding discrimination result. With the eight repetition of the above operation, the data for one bar code is stored in the data shift register 410. The data in digital signals of parallel 8 bits is transferred to the data register 411, and memorized therein when the memory command pulse is applied from the memory command pulse generator 408. The memorized data in 8-bit digital signals is maintained until the following data conversion for another bar code is terminated. It must be understood that record prohibition space, the width $W_1$ thereof being wide enough to exceed 24 bits of the first clock pulses $T_1$, is alloted on the card 80, which results in that all the $Q_1$ to $Q_{24}$ outputs of the register 405d become "1" level when scanned. The "1" level signal at $Q_{24}$ output is applied to the AND gate 408c in the memory command pulse generator 408, and counted by the counter 408d as one bar symbol. Therefore the space is combined with the adjacent parallel arranged bar code in the above data conversion process. In the same manner, the white bar symbol formed between the two bar codes is also combined with the following bar code.

The 8-bit bar code information, the buffer full flag information and the sweep start information from the A-D converter 40 and the card information from the card detector 90 are used in the signal processing unit 60.

The signal processing unit 60 makes signal processing according to the predetermined processing program shown in FIG. 7. In the flow chart, dotted line arrows denote information transmission from the A-D converter 40 and the card detector 90, whereas solid line arrows represent information transmission in the signal processing unit 60. The card information, the sweep start information, the space flag information, the buffer full flag information and the bar code information are respectively denoted as CARD , SWP, SP, BF and BAR CODE. Further, alphabetical letter i (variable) designates a number named on each letter in each group. Therefore, respective four letters in each group are designated as 1, 2, 3 or 4 in terms of i, in the embodiment. Letter j (variable) designates a group number and changes in number from 1 to 7, corresponding to seven groups. Data (i, j) designates an 8-bit data corresponding to each letter among twenty-eight letters in total. OLD (i) designates an 8-bit data of one bar code derived from the preceding read-in operation. Further, INDEX (j) designates a first letter of four of each group in other words, equal to DATA (i,j). The index letters employed in this embodiment are @, 1, 2, 3, 4, 5 and *. After a "START" step 100, a discrimination step 101 designated as "CARD DETECTION" is repeated until the card 80 is detected by the card detector 90. If the card 80 is detected, with an indication "YES" the variable j is set to 1 in the following processing step 102. Simultaneously sweeping operation of the image sensor 20 is checked up in a discrimination step 103 designated as "SWEEP START", and the variable i is set to 1 in a processing step 104 in synchronism with the preceding step 103 when "YES" is indicated representing that the image sensor 20 is being swept. Buffer full flag information as to setting condition of 8-bit data in the data register 411 of FIG. 4(B) is checked in a discrimination step 105 designated as "BUFFER FULL FLAG". In case a "NO" sign representing that setting the 8-bit data has not been completed is produced, a following discrimination step 106 designated as "SPACE FLAG" checks the existence of the space bar symbol in the record prohibition region of the card 80. The discrimination step 106 is followed by the processing step 104 with the existence of the space bar symbol as indicated by "YES". On the other hand, a discrimination step 107 designated as "SWEEP START" follows in absence thereof with "NO" sign. In this step 107, the following sweeping operation of the image sensor is checked. If the above result is "YES" the processing step 104 follows and a discrimination step 108 follows if the result is "NO". In the step 108 designated as "CARD DETECTION", the card existence is checked. If the card 80 is detected, processing is returned to the step 105 for the repetition of the above sequential discrimination with the indication "YES". On the other hand processing ends in "UNREADABLE" step 109 with the discrimination result being "NO". Under the normal condition, the above sequential steps 105 to 108 are repeated until the image sensor 20 starts to scan the bar code. A processing step 110 follows the discrimination step 105 with its sign "YES", and the stored 8-bit bar code information is read in from the data register 410 of FIG. 4(B). The information is stored in DATA (i,j) thereafter and the variable i is changed to i+1. In a following discrimination step 113 designated as "i>4", the variable i is compared with the numeral 4 which is the maximum digit number included in one group. If the integer variable i is not larger than 4, the step 105 follows again with the sign "NO" to read a next bar code in the same group. If, on the other hand, i is larger than 4, "YES" sign representing that the four bar codes in one group have been read in is provided and, follows a discrimination step 114. In this step 114 designated as "DATA (i,j)=OLD (i)", coincidence between DATA (i, j) and OLD (i), with i ranging from 1 to 4, is checked. Processing after the step 114 is returned to the discrimination step 103 by way of processing step 116 with the discrimination result "NO". The DATA (i, j) is replaced by the OLD (i) in the step 116. On the other hand, d discrimination step 115 designated as "DATA (l, j)=INDEX (l)" follows after the step 114 with the result "YES". The following processing, however, is returned again to the step 103 in case of a "NO" sign representing that the DATA (l, j) does not coincides with the INDEX (l). With the "YES" sign representing the coincidence therebetween, processing proceeds to a discrimination step 117, "DATA (i, j) ALL BAR CODES", wherein the remaining three letters except for the index letter in one group, DATA (i, j) with i ranging from 2 to 4, is checked as to whether they correspond to the bar codes predetermined by the above-described "2 OUT OF 7 combination" or not. The discrimination step 103 or a discrimination step 119 follows after a processing step 118 with either result, "NO" or "YES", of the step 117. The variable j is set to j+1 in the step 118, and, thereafter, is compared with the numeral 7 which is the maximum number of groups included in one card in the step 119 designated as "j>7". If j is not larger than 7, a "NO" sign is provided and the step 103 follows again to read the letter in the following group. If, on the other hand, j is larger than 7, a "YES" sign is provided to an "END" step 120 which, in turn, comes to finish the above read-in proceedings for one information card.

In the above sequential steps, check for read-in completion of 4 letters (bar codes) in one group, coincidence of the letters consecutively read in, sequential order of index letters and coincidence of the read-in letters with "2 OUT OF 7 combination" are made in the steps 113, 114, 115 and 116 respectively. Therefore the read-in accuracy is very high.

Although the above embodiment is described in that the bar symbols are scanned orthogonally, the repetitive scanning can be fulfilled other than the orthogonal scanning so long as the scanning direction crosses the longitudinal direction of the bar symbols. Further, other modifications such as a laser beam source in place of the light source and transferring the image sensor instead of the card can be made without departing the scope of this invention.

What is claimed is:

1. An apparatus to read in bar-coded information provided on a surface of an object in bar codes having a plurality of parallel bar symbols of at least two bar widths and extending in a first direction comprising:
   a clock for generating a train of pulses at a fixed frequency;
   a sensor including a plurality of light responsive elements arranged in a straight line along a scanning direction and connected to said clock, for scanning said bar symbols one by one in response to said train of pulses to produce a train of signals indicative of said bar symbols, the scanning of said sensor along said scanning direction being transverse to said first direction and being controlled by said clock to repeat scanning more than twice; and a sample and hold circuit for sampling and holding the output levels of said train of signals in synchronized relation with said train of pulses to produce a continuous signal.

2. An apparatus as claimed in claim 1, further comprising:

means for transferring said object with respect to said sensor, relative movement between said object and said sensor being in a said first direction transverse to said scanning direction of said sensor.

3. An apparatus as claimed in claim 1, wherein said sensor comprises:

a light source for projecting light on said surface, and a lens for converging the light reflected by said bar symbols.

4. An apparatus as claimed in claim 3, further comprising:

a detection circuit, electrically connected to said sample and hold circuit for producing rectangular detection signals in response to said continuous signal, at time intervals proportional to the width of said bar symbols.

5. An apparatus to read in bar-coded information provided on a surface of an object in bar codes having a plurality of parallel bar symbols of at least two bar widths and extending in a first direction comprising:

a clock for generating a train of pulses at a fixed frequency;

a sensor including a light source for projecting light onto a surface, a lens for converging the light reflected by bar symbols, a plurality of light responsive elements arranged in a straight line along a scanning direction and connected to said clock, for scanning said bar symbols one by one in response to said train of pulses to produce a train of signals indicative of said bar symbols, the scanning of said sensor along said scanning direction being transverse to said first direction and being controlled by said clock to repeat scanning more than twice;

a detection circuit, electrically connected to said sensor, for producing rectangular detection signals in response to the train of signals of said sensor at time intervals proportional to the width of said bar symbols; and a time interval discrimination circuit, electrically connected to said detection circuit, for comparing the time interval of said detection signal with a preset time interval and for consecutively producing discrimination signals.

6. An apparatus as claimed in claim 5, further comprising:

a conversion circuit, electrically connected to said discrimination circuit, for storing said consecutive discrimination signals and for producing digital signals of plural bits, each bit being parallel with each other and the signal level thereof corresponding to each bar width.

7. An apparatus as claimed in claim 5, wherein said discrimination circuit includes means for changing said preset time interval in accordance with a preceding discrimination result.

8. An apparatus to scan bar-coded information recorded on a card with bar codes, each thereof having parallel arranged bar symbols of different bar width, said bar codes being grouped and each group being arranged to extend in the card transfer direction comprising:

a light source for illuminating said card;

a clock for generating clock pulses of a fixed frequency;

an image sensor having a photo diode array, electrically connected to said clock and optically coupled, to automatically repeat sequential scanning of the reflected light in the direction orthogaonal to the longitudinal direction of said bar symbol upon receipt of said clock pulses and to produce a train of analogue signals indicative of said bar width;

means for transferring said card along the direction in which said groups extend;

a sample and hold circuit for sampling and holding the output levels of said train of analogue signals in synchronized relation with said clock pulses to produce a continuous signal;

a detection circuit connected to said sample and hold circuit for producing rectangular detection signals in response to said continuous signal at time intervals proportional to the width of said bar symbols; and a converter, electrically connected to said detection circuit, for converting said rectangular signals into plural bits of digital signals, each signal level thereof being indicative of bar width of said bar symbol.

9. A method to read in bac-coded information provided on a surface of an object in the form of bar symbols comprising the steps of:

producing a train of clock pulses;

transferring said object in the same direction as said bar symbols extend;

illuminating said surface of said object;

applying the light reflected from said surface to a plurality of light responsive elements arranged in a straight line in a direction orthogonal to said transferring direction;

triggering said elements one by one at a fixed frequency to produce a train of image signals indicative of the bar width;

repeating said scanning in parallel with the preceding scanning;

sampling and holding the output levels of said train of image signals in synchronized relation with said train of pulses to produce a continuous signal;

shaping said continuous signal into a train of rectangular signals; and converting said rectangular signals into plural bits of digital data.

10. A method as claimed in claim 9, further comprising the steps of:

storing said digital data;

checking up the coincidence between said stored data and current data; and reading in said data when the two data coincide.

11. An apparatus to read in bar codes having a plurality of bar symbols extending parallel to each other on an object surface comprising:

a clock for generating pulses of a fixed frequency;

a sensor including a plurality of light responsive elements arranged in a straight line along a scanning direction and connected to said clock to be cyclically triggered one by one for scanning said bar symbols along a single line thereof in response to said pulses, and producing a train of analogue signals indicative of bar width, said sensor being so adapted that said line is substantially orthogonal to the longitudinal direction of said bar symbols, whereby each bar code is scanned more than twice along said line of said sensor;

a sample and hold circuit for sampling and holding the output levels of said train of analogue signals in synchronized relation with said clock pulses to produce a continuous signal; and a detection circuit connected to said sample and hold circuit for producing rectangular detection signals in response to said continuous signal at time intervals proportional to the width of said bar symbols.

12. A method for reading bar code information having a plurality of parallel bar symbols recorded alternately in contrasting colors and in different bar widths comprising the steps of:

providing a plurality of light responsive elements arranged in a straight line and effective, when activated, to produce respective output signals indicative of the color of a bar from which light is incident on said elements;

causing relative movement between said light responsive elements and said parallel bar symbols in such a constant direction that said light responsive elements extend transversely with said parallel bar symbols;

activating said light responsive elements one by one at a constant frequency so that said parallel bar symbols are represented by a train of intermittent output signals produced from said light responsive elements;

measuring time periods in which said intermittent output signals are kept unchanged;

comparing each of the measured time periods with a reference time period so that each bar width is discriminated;

sampling the output levels of said intermittent output signals produced from said light responsive elements at the same frequency with said constant frequency;

holding the sampled output levels to produce a train of continuous output signals;

shaping said continuous output signals into a train of rectangular signals having contrasting output levels corresponding to said contrasting colors of said parallel bar symbols and time periods corresonding to said bar widths of said parallel bar symbols.

13. A method as claimed in claim 12, further comprising the step of:

changing said reference time period in response to the preceding comparison result of said comparing step and the measured time periods of said measuring step.

14. A method as claimed in claim 13, further comprising the steps of:

applying said continuous output signals produced from said holding step to a low pass filter; and feeding back the filtered continuous output signals to said intermittent output signals produced from said light responsive elements so that low frequency signals included in said intermittent output signals are eliminated therefrom.

15. A method as claimed in claim 12, further comprising the steps of:

repeating said activating step plural times on said parallel bar symbols so that said measuring and comparing steps are subsequently repeated;

storing the comparison results produced during the preceding cycle of said activating step;

checking coincidence between the stored comparison results of said storing step and the comparison results produced during the current cycle of said activating step; and invalidating the stored comparison results of said storing step when the coincidence is not found in said checking step.

* * * * *